(12) United States Patent
Alldredge et al.

(10) Patent No.: US 6,360,926 B1
(45) Date of Patent: Mar. 26, 2002

(54) DEVICE FOR DIRECTED DISPENSING OF FREE-FLOWING MATERIALS

(75) Inventors: Evette Alldredge; Gregg D. Niven, both of Salt Lake City, UT (US)

(73) Assignee: Evette Alldredge, Salt Lake City, UT (US)

(*) Notice: Subject to any disclaimer, the term of this patent is extended or adjusted under 35 U.S.C. 154(b) by 0 days.

(21) Appl. No.: 09/528,925

(22) Filed: Mar. 20, 2000

(51) Int. Cl.[7] ................................................. B67D 3/00
(52) U.S. Cl. ........................ 222/510; 222/470; 222/473
(58) Field of Search ............................... 222/509, 510, 222/518, 473, 470, 157, 158

(56) References Cited

U.S. PATENT DOCUMENTS

| | | | |
|---|---|---|---|
| 1,003,047 A | * 9/1911 | Iruz | 222/510 |
| 1,094,350 A | * 4/1914 | Walter | 222/510 |
| 1,130,906 A | * 3/1915 | Johnson | 222/510 |
| 1,921,933 A | 4/1933 | Levenberg et al. | |
| 2,583,001 A | * 1/1952 | Magers | 222/510 |
| 2,628,000 A | 2/1953 | MacKenzie | |
| 5,228,591 A | 7/1993 | Jones | |
| 5,622,285 A | * 4/1997 | Lee | 222/158 |
| 5,967,380 A | * 10/1999 | Litvin | 222/518 |
| 6,216,754 B1 | 4/2001 | Geroult et al. | |

* cited by examiner

Primary Examiner—Philippe Derakshani
Assistant Examiner—Thach H. Bui
(74) Attorney, Agent, or Firm—Clayton, Howarth & Cannon, P.C.

(57) ABSTRACT

A dispensing device including a container with a top aperture adapted for the entry of free-flowing materials and a bottom opening adapted for the directed dispensing of free-flowing materials, a handle, a thumb release trigger associated with a stopper located in the opening. Downward pressure on the thumb release trigger moves the stopper downward allowing the free-flowing material to be dispensed out of the opening. The opening and stopper are adapted to direct the dispensing of the free-flowing material, thereby reducing the spilling inherent in many of the devices found in the prior art.

29 Claims, 5 Drawing Sheets

DEVICE FOR DIRECTED DISPENSING OF FREE-FLOWING MATERIALS

BACKGROUND

1. The Field of the Invention

This invention relates to devices for dispensing free-flowing materials. More particularly, the present invention relates to devices which dispense materials toward a desired location, such materials including subdivided materials, granulated powders and fluids.

2. The Background Art

A common task which is carried out many times every day is the directed dispensing of granulated powders, such as dry powdered infant formula. These powdered infant formulas posses characteristics of storability, transportability and ease of use that are seen as great advantages in the feeding and care of infants. To use a powdered infant formula, a measured amount of the powder must be placed in a feeding, or mixing, container, typically a baby bottle. After dispensing of the powered infant formula, a measured amount of liquid is then mixed with the powder to constitute the formula.

Mixing powered infant formula requires the placement of a measured amount of formula into a container which typically has a constricted opening, such as a baby bottle. The current methods for directing the powered infant formula into a baby bottle include measuring spoons and scoops provided with the formula by the manufacturer. Both of these methods require the user to take the time and effort to carefully pour the formula into the bottle without spilling. This pouring of the powered infant formula into the baby bottle often has to be done while holding the infant, under poor lighting conditions, sometimes in a moving vehicle, and/or under other adverse conditions, all which lead to spillage and waste of the powered infant formula. Thus, there has been a long felt need in the art to provide an improved device for directing powered infant formula into a baby bottle. Thus, it would be a great improvement in the art to provide a device for measuring and dispensing powered infant formula into a baby bottle, as well as dispensing other free flowing materials to a directed location, which requires less effort on the part of the user and which also reduces the waste and spillage which is experienced using the available devices.

Other devices for dispensing free-flowing materials have been previously proposed, such devices having one or more significant drawbacks. One example of a previously available device is disclosed in Fuss, U.S. Pat. No. 3,893,598. The device in Fuss provides a housing which holds a measured quantity of material but is unable to directedly dispense the material. The Fuss-type device features one or more flaps which pivot to open the bottom of the housing, allowing the free-flowing material to pass out the bottom of the housing. Disadvantageously, no structure is present to direct the flow of free-flowing material as a controlled stream allowing the flow to be directed into a container with a restricted (for example, small) opening. The Fuss device is also disadvantageously constructed from loosely fitting multiple pieces, leaving gaps and openings in the structure, through which materials, such as subdivided or powdered solids, can undesirably flow. This limits use of the Fuss device to only materials having a large particle size, as small particle or fluid free-flowing material undesirably seeps through the gaps and openings in the Fuss device. Furthermore, foreign matter can enter the free-flowing material through these gaps. Moreover, the structure of the Fuss device is susceptible to having an edge thereof be broken off from one of the multiple pieces of the Fuss device allowing undesirable entrance or exit of materials into the device.

The background art also includes measuring scoops, an example of which is disclosed by Dubin, U.S. Pat. No. 2,747,410. While the Dubin scoop allows for the measuring of materials, by using the same structure for the entry and exit of free-flowing material, the Dubin scoop suffers the same problems as a measuring spoon.

Syringe type devices are also known in the background art. Douglass, U.S. Pat. No. 2,056,173, and Matz, U.S. Pat. No. 5,092,491, disclose devices that use a plunger inside a cylinder to measure an amount of free-flowing material. These devices require the user to use both hands to measure and then dispense the material.

In view of the drawbacks inherent in the available art, it would be a significant advance in the art to provide a device for measuring and directedly dispensing free-flowing material which directs the flow of free-flowing material, and allows the dispensing of small particle size, or fluid free-flowing material, while reducing the possibility of introducing foreign matter into the free-flowing material. It would also be an advancement in the art to provide a device for measuredly and directedly dispensing free-flowing material which requires only one hand to operate.

BRIEF SUMMARY AND OBJECTS OF THE INVENTION

In view of the above described state of the art, the present invention seeks to realize the following objects and advantages.

It is a primary object of the present invention to directedly dispense free-flowing materials, allowing free-flowing materials to be dispensed into containers with restricted openings without the need for funnel devices.

It is another object of the present invention to directedly dispense all types of free-flowing materials, including materials with a small particle size and fluids.

It is also an object of the present invention to increase the ease of measurement and dispensing of free-flowing materials.

It is a further object of the present invention to allow for directed dispensing of free-flowing materials while avoiding the introduction of foreign matter into the free-flowing material.

It is another object of the present invention to allow for the directed dispensing of free-flowing materials with a device requiring only one hand to operate.

These and other objects and advantages of the invention will become more fully apparent from the description and claims which follow, or may be learned by the practice of the invention.

The present invention accomplishes these objects using a novel structure providing advantages not previously available in the art. The present invention includes a device useful for the measurement and directed dispensing of free-flowing materials. The device includes a top aperture for the entry of free-flowing material, has a bottom opening adapted to directedly dispense free-flowing material, and means for closing and opening the bottom opening. Once free-flowing materials are taken into the container through the top aperture, the means for opening the bottom can be actuated, allowing the free-flowing material to be directedly dispensed out the bottom opening, eliminating the need to use a funnel which was customary in the prior art.

The device can be constructed so the method of actuating the means for opening is accomplished by the user's hand holding the device, advantageously allowing for one handed operation. The device can be adapted for measuring any number of free-flowing materials. In a preferred embodiment, the device is constructed from one integral piece of injected molded plastic, and the device has the advantage of a reduced chance of stray matter breaking off the device and entering the dispensed free-flowing material as foreign matter.

The present invention further includes a method of manufacturing the device with substantially one piece construction, through the process of injection molding. This method produces the device with the advantage of a reduced chance of stray matter breaking off the device and entering the dispensed free-flowing material as foreign matter.

BRIEF DESCRIPTION OF THE DRAWINGS

In order to better appreciate how the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Reference will now be made to the drawings wherein like structures will be provided with like reference designations.

The present invention provides a device for the directed dispensing of free-flowing material which overcomes many of the problems found in the previously available devices. In one preferred embodiment, the device of the present invention has substantially one piece construction, accomplished by injection molding. Moreover, the preferred embodiments of the invention may also have graduation markings on the container allowing for accurate measurement of materials which are dispensed therefrom. The invention may be used for measuring and directedly dispensing any number of free-flowing materials.

Examples of classes of free-flowing material which may be advantageously dispensed using the embodiments of the present invention include: Foodstuffs such as sugar, salt, powdered cocoa, baking soda, powdered dry infant formula, sesame seeds, poppy seeds, coffee beans, powdered coffee, and any other subdivided food solid which is capable of being poured; Chemicals such as laundry detergent powder that are subdivided or powdered solids, or fluids such as acetic acid which are capable of being poured; Cosmetics such as baby powder that are subdivided or powdered solids, or fluids such as shampoos which are capable of being poured; and, Pharmaceuticals such as effervescent sodium bicarbonate powder that are subdivided or powdered solids, or fluids such as pseudoephedrine elixir which are capable of being poured.

One preferred, but not intended to be limiting, use of the embodiments of the present invention is to measure and directedly dispense powdered baby formula into a mixing or feeding container such as a baby bottle. As will be appreciated, the present invention has particular benefits when being used to dispense a free-flowing granulated powder.

Figure 1:
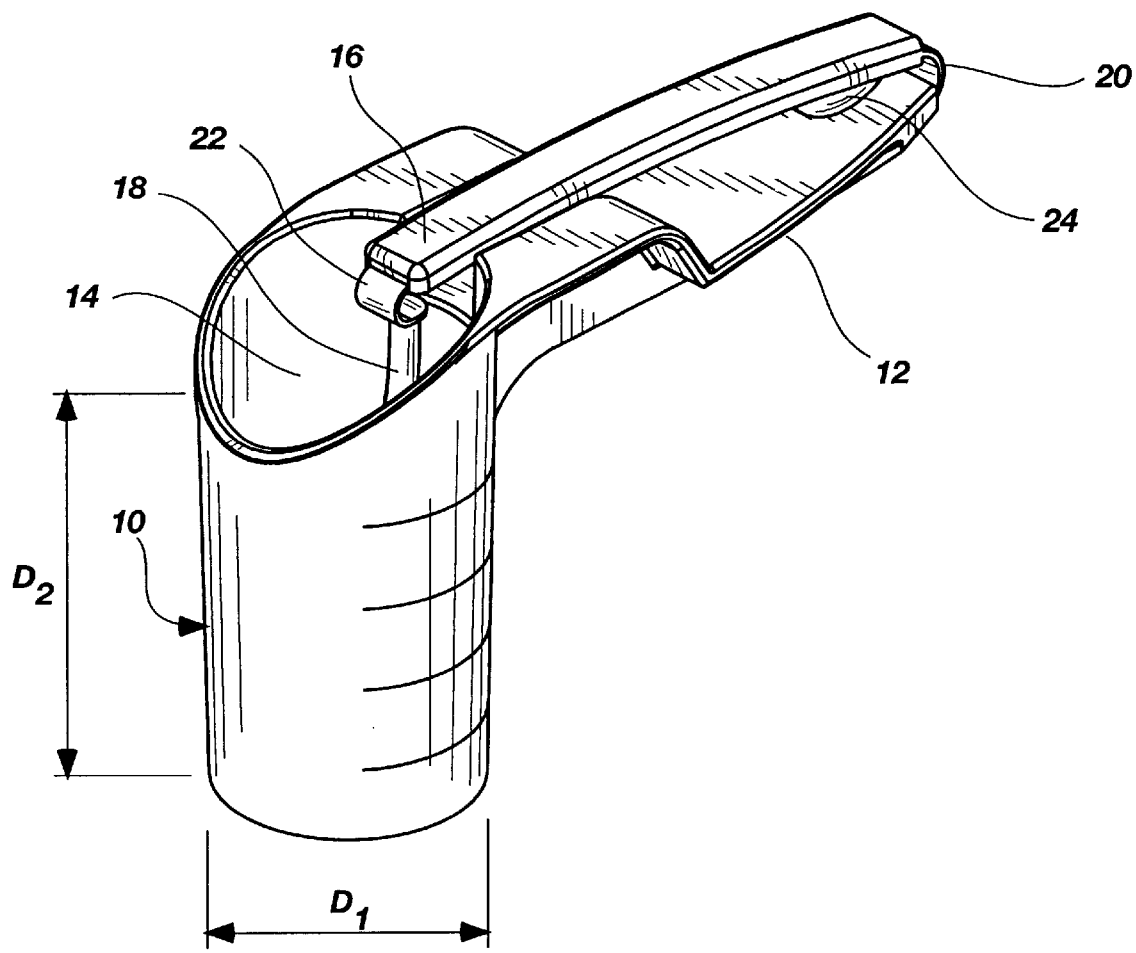
FIG. 1 is a perspective view illustrating a first embodiment of a dispensing device in accordance with the invention.

As shown in FIG. 1, the first embodiment comprises a cylindrical container generally indicated at 10. While the cylindrical shape of the container 10 is preferred, the container may alternatively have any shape which allows for dispensing including shapes which have a cubical, square, round or ovoid cross section, or any other shape known to be useful by those skilled in the art. The container may be constructed of any material suitable for the type of free-flowing material to be dispensed, in this embodiment the preferred material is injection molded plastic.

A top aperture, generally indicated at 14, adapted for the entry of free-flowing material is located at the top of the container 10. In the first embodiment, illustrated in FIG. 1, this aperture is adapted for the entry of granulated powder into the container, by use of the container 10 as a scoop. Alternative ways to fill the container 10 include direct filling from a tap or spigot, pouring free-flowing material into the container 10, spooning free-flowing material into the container 10 and any other ways known to those skilled in the art.

Attached to the container 10 is a handle, the handle being generally indicated at 12, the handle contains an actuation structure which allow a user to dispense the material held in the container 10. The structures shown in FIG. 1 are one example of an actuation means for directed dispensing. In the first embodiment, illustrated in FIG. 1, the actuation means for directed dispensing is carried out by a release trigger, generally indicated at 16. In the first embodiment, illustrated in FIG. 1, dispensing of the material from the container 10 is carried out by the interaction of the user's hand with the handle 12 of the device, allowing for operation with one hand.

In the first embodiment, illustrated in FIG. 1, dispensing of the material from container 10 is preferably accomplished by downward motion of the thumb of the user's hand (the hand and thumb not explicitly represented in FIG. 1). During use, it is preferred that the user's hand grasp the handle 12 so that a thumb is positioned on a release trigger, generally indicated at 16 in FIG. 1.

Attached to the release trigger 16 is a connector 22. This connector 22 is a flexible connection which flexes when the release trigger 16 is depressed, allowing for smooth dispensing. Connector 22 also functions in closing the device as explained below.

As those skilled in the art will appreciate, the actuation means of the present invention may be carried out using many structures other than those explicitly described herein. Moreover, the actuation means of the present invention can also be activated by actions of the user other than those explicitly discussed herein. It is to be noted that any structure which can be used to move the stopper in a downward direction, upon interaction with the appropriate structure by the user, is intended to be equivalent to the structures disclosed herein which carry out the actuation means. Alternative structures coming within the scope of the present invention can perform equivalent functions, and can be activated by the user in ways other than those explicitly disclosed herein. Examples of such structures include structures which are actuated by a squeezing motion of the user's hand holding the handle, structures actuated by motion of a finger or fingers of the hand holding the handle, and structures which are actuated by the user's second hand which is not holding the handle, i.e. requiring two-handed operation. It will be appreciated, however, that embodiments of the present invention which provide one-handed operation are most preferred.

Figure 2:
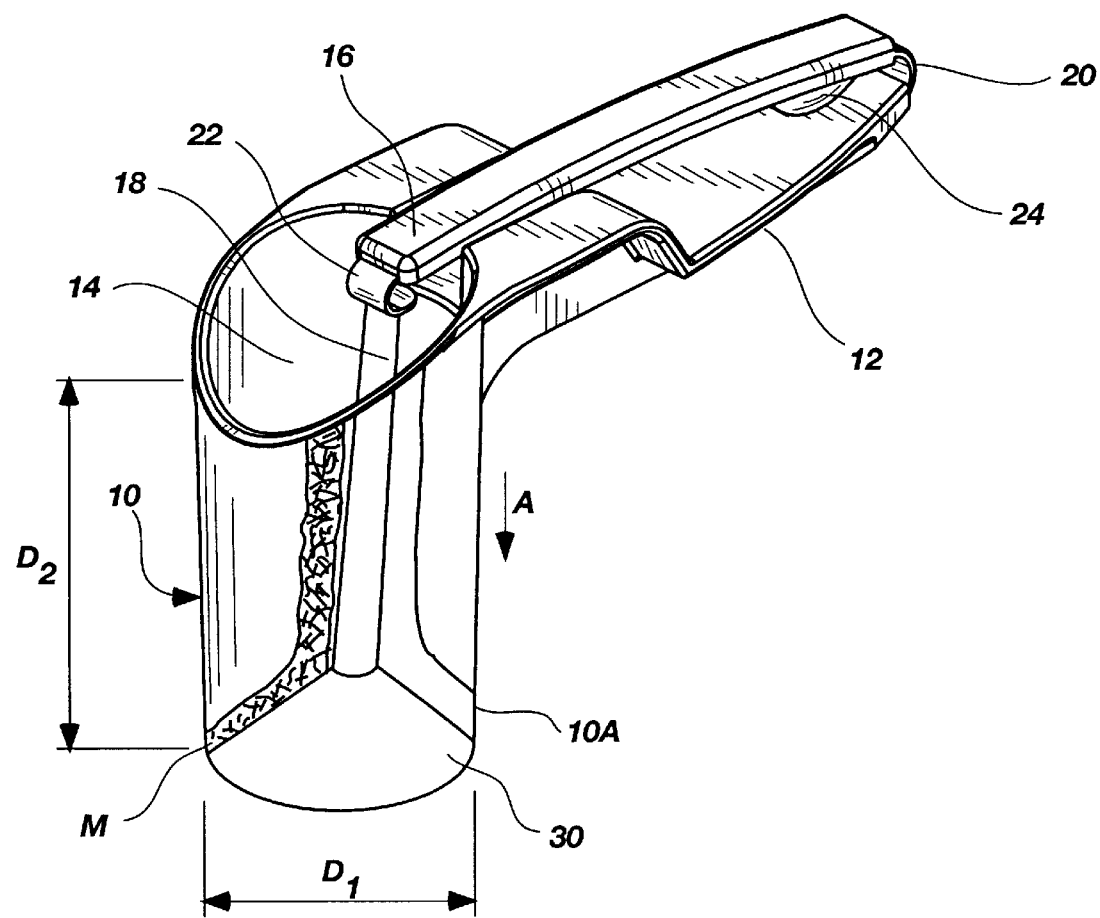
FIG. 2 is a partially cutaway view of the first embodiment of the dispensing device illustrated in FIG. 1 showing a stopper in accordance with the present invention.
Figure 3:
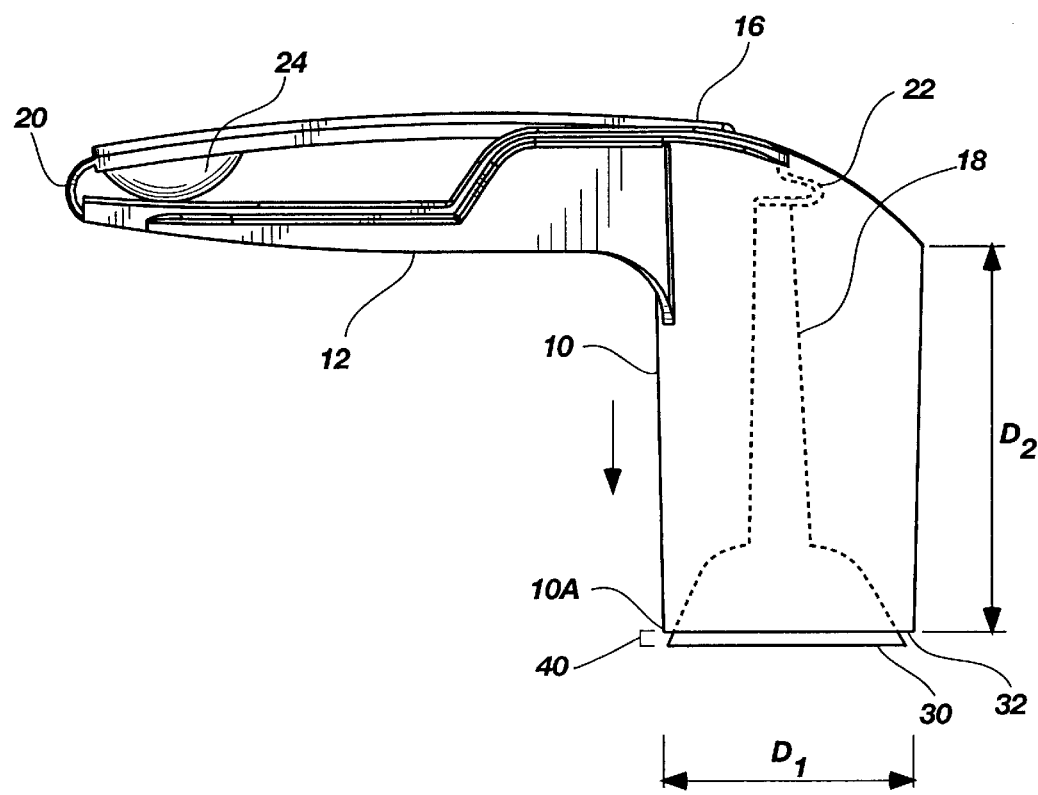
FIG. 3 is a view of the first embodiment of a dispensing device in accordance with the invention with the stopper moved into the downward position to allow for dispensing of the free flowing material.

Reference will now be made to FIGS. 2 and 3. In FIGS. 2 and 3, an interconnecting member, generally represented at 18, is shown attached to a movable stopper, generally indicated at 30. As shown best in FIG. 3, the container 10 includes a bottom opening, generally indicated at 32. Normally, stopper 30 is located so as to close the bottom opening 32 and hold the material (represented in FIG. 2 at M). The contact between stopper 30 and the sidewall 10A of the container 10 forms a seal. The seal is sufficiently tight to prevent the passage of free-flowing material there through.

In the first embodiment of the present invention represented in FIGS. 1–3, this seal is sufficiently tight to prevent the passage of dry powdered infant formula. In alternative embodiments this seal may be made fluid tight. It is within the scope of the present invention to fabricate the stopper 30 and the bottom opening 32 so that the mating of these two structures provides a fluid tight seal or, alternatively, it is also within the scope of the present invention to provide an additional sealing structure on the stopper 30, around the edge of the sidewall 10A of the container 10, to provide the desired seal. It will also be appreciated that other structures are available to those skilled in the art for providing the desired seal.

In the first embodiment of the invention represented in FIGS. 1–3, the stopper 30 preferably has a conical shape. It is within the scope of the present invention to provide a stopper structure which encompasses other shapes known to those skilled in the art, all of selected in accordance with the principals taught herein.

During operation, when the release trigger 16 is depressed, the interconnecting member 18 moves in a downward direction, as indicated by Arrow A. The stopper 30 moves downward, as shown in FIG. 3, creating a gap 40 between the sidewall 10A and the stopper 30. This gap 40 allows the material to flow out of the bottom opening 32.

Advantageously, when a free-flowing material is dispensed, the preferred embodiments of the invention aim the direction of flow of the free-flowing material. The aiming of the flow of the free-flowing material are carried out by the bottom opening 32 and the stopper 30 which are adapted for conducting directed dispensing. In the first embodiment of the present invention represented in FIGS. 1–3, directed dispensing is accomplished by the shape of the bottom opening 32 and the shape of the stopper 30. The material flows out through the gap 40 created between the bottom opening 32 and the stopper 30, which limits the volume of the flow, the flow is advantageously directed by the conically shaped stopper 30 into an easily directed stream.

The feature of the present invention allowing directed dispensing of a material is a great advantage and allows the material to be directed into a container with a restricted opening, minimizing waste and spilling. The first presently preferred embodiment of the present invention is particularly adapted for directing dispensing of material into a baby bottle. It is well known that commonly used baby bottles have a circular opening having a diameter of about 1.25 inches. Thus, it is preferred that the container 10 have a diameter (indicated in FIG. 1 at $D_1$) of 1.0 inches. It will be appreciated that the exemplary dimensions indicated at $D_1$ and $D_2$ in FIG. 1 preferably fall within the following ranges:

| Dimension | Preferred | Very Preferred | Most Preferred |
|---|---|---|---|
| $D_1$ | 0.25–3.0 inches | 0.5–2.0 inches | 0.75–1.0 inches |
| $D_2$ | 0.25–4.5 inches | 0.5–3.0 inches | 1.0–2.0 inches |

It will be appreciated that in the case of directed dispensing to a baby bottle having a 1.25 inch diameter opening the preferred dimension $D_1$ may be 0.75–1.0 inches. In the case of directed dispensing to a container with a smaller opening, such as a pill bottle, the dimension $D_1$ will be correspondingly smaller to allow the material to flow into the smaller opening. For directed dispensing to a container with a larger opening, the dimensions may be correspondingly larger.

It will also be appreciated that the combination of dimensions $D_1$ and $D_2$ determine the volume of the container 10. The dimensions may, but are not required to be set such that the total volume of the container is a selected amount. This allows for the measurement of a desired amount of free-flowing material, such as a tablespoon, by the complete filling of the container. Additionally, graduation markings may be placed on a sidewall of the container to allow for measurement of amounts less than total volume.

It will be further appreciated that the stopper 30 and the opening 32 can take other shapes, such other shapes and structures becoming apparent to those skilled in the art after consideration of the teachings set forth herein, for directing the flow of free-flowing material. All structures which would be considered equivalent to those disclosed herein may be used as alternative structures for directing the flow of material.

Once the material is dispensed, the bottom opening 32 can be closed by means for moving the stopper upwards and the stopper 30 assumes the position shown in FIG. 2. In the first embodiment of the present invention depicted in FIGS. 1–3, the release of the trigger release 16 allows a living hinge, generally designated at 20 in FIGS. 1–3, in cooperation with a fulcrum 24, and the connector 22, to bias the stopper 30 upwards, closing the bottom opening 32. The living hinge 20 can be fabricated using techniques known in the industry. Further information regarding the structure and fabrication of living hinges can be obtained from the Design and Engineering Handbook available online at http://www.eastman.com/ppbo/design/contents.htm, which is now incorporated herein by this reference in its entirety, including linked webpages.

It will be appreciated that it is within the scope of the present invention to utilize other structures to bias the stopper 30 to its closed position represented in FIG. 1. For example, alternative embodiments of the invention can utilize many different structures to carry out the biasing of the stopper 30 to its closed position. For example, one or more springs can be used to bias the stopper 30 in an upward direction. The use of springs has disadvantages, such as requiring multiple piece construction of the device, requiring holes to be placed in the structure to allow spring attachment, and particles of the free-flowing material can become caught within the coils of the spring. Thus, the use of the described structure, and particularly the living hinge 20, provides the distinct advantages of allowing one piece construction, without additional holes or attachment points for the biasing means, and will not capture particles of the free-flowing material. In view of the foregoing, it will be understood that many different structures which those skilled in the art can arrive at using the teachings set forth herein, can function to bias the stopper in a closed direction.

While the stopper 30 can assume many shapes other than those shown in FIGS. 1–3, the illustrated conical shape of the stopper 30 shown in FIGS. 1–3 is presently preferred. The conical shape of the stopper 30 advantageously provides the function of centering the stopper in the bottom opening 32 and also functions to direct the flow of material out of the container 10, as described above.

Figure 4:
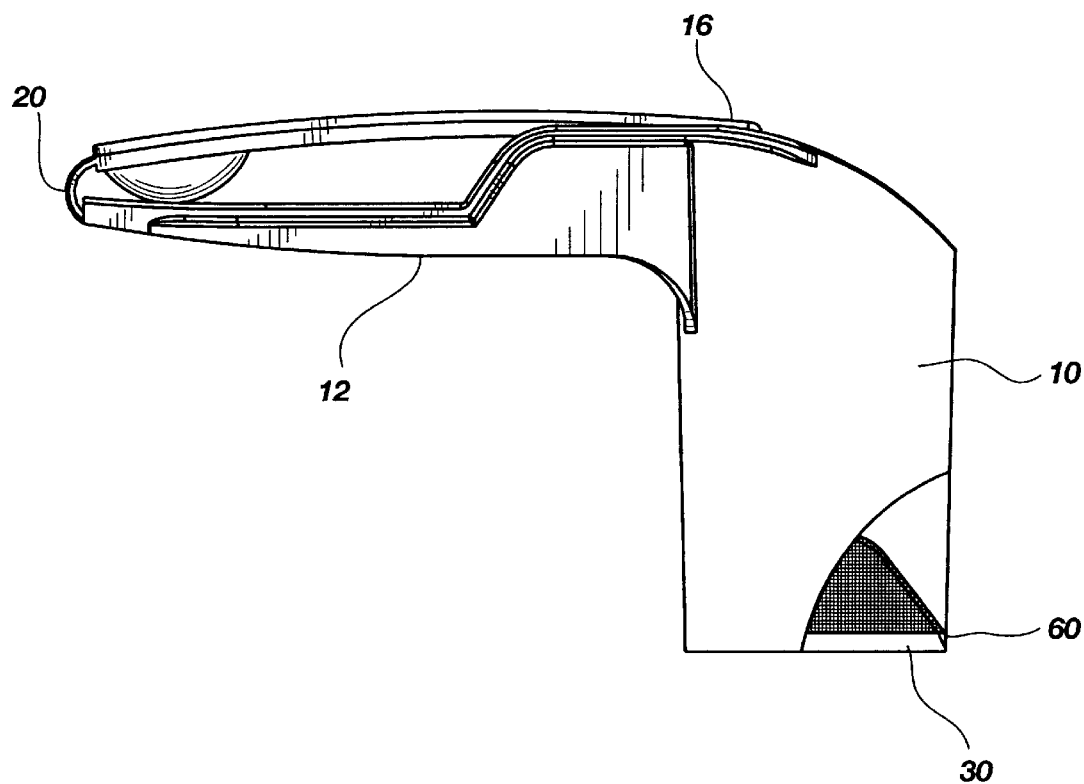
FIG. 4 is a view of a second embodiment of the invention showing an adaptation for sifting the free flowing material.

Reference will now to made to FIG. 4 to describe a second embodiment of the present invention. As previously discussed, the presently preferred embodiments of the invention illustrated herein are merely exemplary of the possible embodiments of the invention, including that illustrated in FIG. 4.

It will be appreciated that the second embodiment of the invention illustrated in FIG. 4 contains many of the same structures represented in FIGS. 1–3 and only the new or different structures will be explained to most succinctly explain the additional advantages which come with the embodiments of the invention illustrated in FIG. 4. The second embodiment of the invention includes a screen 60 positioned at the bottom opening 32, as illustrated in FIG. 4. When the free-flowing material is dispensed from the second embodiment, the free-flowing material must pass through the screen. This allows the invention to be used for sifting or separating larger particles in the free-flowing material from smaller particles in the free-flowing material.

The present invention also preferably includes a method of manufacturing a dispensing device. This method involves the construction of the device as an integral, one-piece unit. It is preferred that the integral, one piece unit is formed by injection molding, using techniques well known to those skilled in the art. Using the preferred injection molding techniques, the embodiments of the present invention may be constructed from many different materials known to those skilled in the art. Such materials include, but are not limited to, thermoplastic polyester, polypropylene, and polyvinylcarbonate, among others. A listing of many such materials suitable for injection molding is contained in the CAMPUS DATABASE version 4, herein incorporated by reference, which is obtainable from members of the Campus Plastics network, who can be reached through the url http://www.campusplastics.com/.

Figure 5:
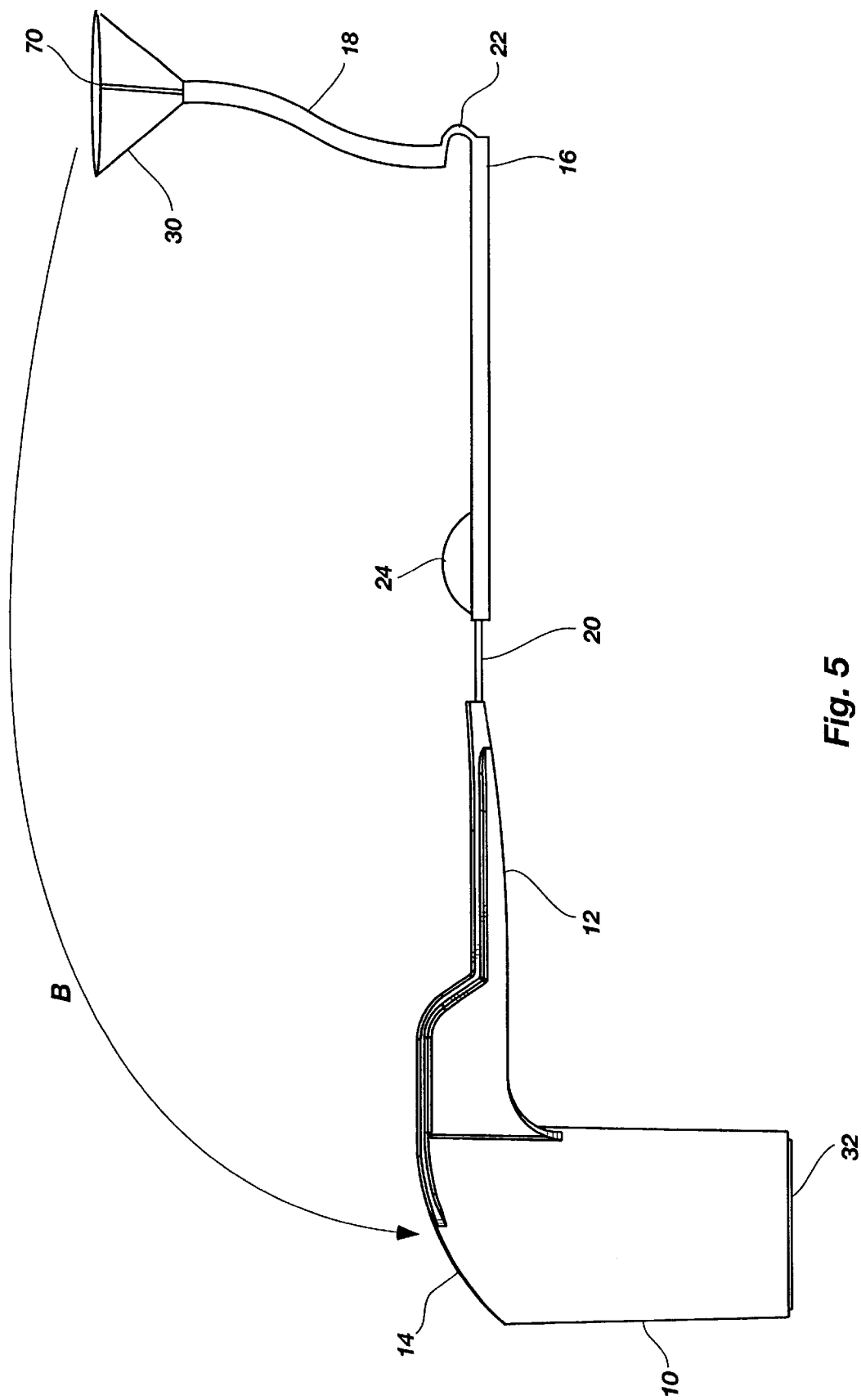
FIG. 5 is a plane view of the first embodiment of the invention showing it in a configuration after it has been injection molded but before it has been assembled into its final configuration.

Reference will next be made to FIG. 5 which is a plan view of a preferred embodiment of the present invention after the injection molding fabrication step has been accomplished and the device has been removed from the mold, but final assembly of the device has not yet been accomplished. The device has structures which correspond to the container 10, handle 12, release trigger 16, living hinge 20, connector 22, and stopper 30. The unit is folded to finish the assembly of the dispensing device. Bending of the unit occurs at the portions corresponding to the connector 22 and living hinge 20 creating the connector 22 and living hinge 20 of the device. The portion corresponding to the stopper 30 passes through the portion corresponding to the container 10, as represented by Arrow B, in such way that once past the bottom opening 32, it can no longer reenter the container 10. In one preferred embodiment of the invention, a prepared slit 70, as shown in FIG. 5, is provided in the stopper 30. The edges of the slit 70 can be forced to overlap each other, thus reducing the diameter of the stopper 30. Once the stopper has passed through the bottom opening 32, the edges of the slit 70 are retracted from their overlap position until the edges abut, closing the slit 70 and preventing any substantial amount of material from passing there through. The diameter of the stopper 30 is then too large to pass through the container 10. Other ways to accomplish this result will be readily apparent to those skilled in the art using the disclosure provided herein.

The device manufactured from the described method advantageously has unitary, one-piece construction. By eliminating the need for multiple pieces which have connecting structures and joints, the manufactured device has fewer places at which pieces of the structure can be broken off and enter the free-flowing material as foreign matter, an advantage over the prior art.

In view of the foregoing, it will be appreciated that the present invention provides a device for directedly dispensing free-flowing materials which allows free-flowing materials to be dispensed into containers with restricted openings without the need to use a funnel structure. The present invention also provides a device for directedly dispensing all types of free-flowing materials, including materials with a small particle size and fluids.

The present invention also provides a device for dispensing materials which provides ease of measurement and dispensing of free-flowing materials and which allows for directed dispensing of free-flowing materials while avoiding the introduction of foreign matter into the free-flowing material. Still further, the present invention allows directed dispensing of free-flowing materials which requires only one hand of a user to operate.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured is:

1. A device for dispensing free-flowing materials comprising:

a container including at least one sidewall;

an aperture formed at the top of the container adapted for the entry of free flowing material;

an opening formed at the bottom of the container adapted for the directed dispensing of free flowing material;

a stopper located so as to have a first position closing the opening and a second position providing a gap between the opening and the stopper allowing the material to pass there between;

a member, the member interconnecting the stopper to the container and allowing the stopper to be selectively moved between the first position and the second position, such that the material is selectively dispensed in a directed manner when the stopper is moved to its second position; and means for moving the stopper to the first position, said means for moving the stopper to the first position comprising at least one living hinge and means for biasing said living hinge in a direction such that the stopper is biased toward the first position.

2. The dispensing device of claim 1, wherein the free-flowing material is selected from the group consisting of: a foodstuff, a chemical, a pharmaceutical, and a cosmetic.

3. The dispensing device of claim 2, wherein the foodstuff is selected from the group consisting essentially of: a subdivided material, a powder, a granulated powder, and a fluid; wherein the chemical is selected from the group consisting essentially of: a subdivided material, a powder, a granulated powder, and a fluid; wherein the pharmaceutical is selected from the group consisting essentially of: a subdivided material, a powder, a granulated powder, and a fluid; and wherein the cosmetic is selected from the group consisting essentially of: a subdivided material, a powder, a granulated powder, and a fluid.

4. The dispensing device of claim 1, further comprising a handle attached to the container, said handle having an attaching end attached to said container and an opposing distal end, said at least one living hinge being disposed on said handle distal end;

said means for moving the stopper to the first position further comprising a trigger release attached to said at least one living hinge, said trigger release comprising a fulcrum positioned to pivot said trigger release about said distal end of said handle.

5. The dispensing device of claim 1, wherein the stopper and the opening form a seal which is substantially tight to free flowing powder in the first position.

6. The dispensing device of claim 1, wherein the stopper and the opening form a seal which is substantially fluidtight in the first position.

7. The dispensing device of claim 1, wherein the stopper comprises a conical shape stopper.

8. A device for dispensing free-flowing material when operated by a user, the device comprising:

a container including at least one sidewall;

a handle attached to the container, the handle adapted to be held in the hand of the user;

an aperture formed at the top of the container adapted for the entry of the free flowing material;

an opening formed at the bottom of the container adapted for the directed dispensing of free flowing material;

a stopper located so as to have a first position closing the opening and a second position providing a gap between the opening and the stopper allowing the material to pass there between;

means for moving the stopper to the second position actuated by interaction of the hand of the user with the handle of the device such that the material is dispensed, said means for moving the stopper to the second position being pivotally attached to said handle via a living hinge; and means for biasing said hinge in a direction such that the stopper is biased toward the first position.

9. The dispensing device of claim 8, further comprising means for biasing the stopper to the first position.

10. The dispensing device of claim 9, wherein the means for moving the stopper to the first position comprise living hinges.

11. The dispensing device of claim 8, wherein the interaction of the hand of the user with the handle consists of a motion of the thumb.

12. The dispensing device of claim 8, wherein the interaction of the hand of the user with the handle consists of a motion of a finger.

13. The dispensing device of claim 8, wherein the free-flowing material is selected from the group consisting of: a foodstuff, a chemical, a pharmaceutical, and a cosmetic.

14. The dispensing device of claim 8, wherein the foodstuff is selected from the group consisting essentially of: a subdivided material, a powder, a granulated powder, and a fluid; wherein the chemical is selected from the group consisting essentially of: a subdivided material, a powder, a granulated powder, and a fluid; wherein the pharmaceutical is selected from the group consisting essentially of: a subdivided material, a powder, a granulated powder, and a fluid; and wherein the cosmetic is selected from the group consisting essentially of: a subdivided material, a powder, a granulated powder, and a fluid.

15. The dispensing device of claim 8, wherein the stopper and the opening form a seal which is substantially tight to free flowing powder in the first position.

16. The dispensing device of claim 8, wherein the stopper and the opening form a seal which is substantially fluidtight in the first position.

17. The dispensing device of claim 8, wherein the stopper comprises a conical shape stopper.

18. A device for dispensing free-flowing materials comprising:

a container including at least one sidewall;

an aperture formed at the top of the container adapted for the entry of free flowing material;

an opening formed at the bottom of the container adapted for the directed dispensing of free flowing material;

a stopper located in a first position so as to close the opening;

the stopper being interconnected to the container by a member;

the container, the stopper and the member being formed of substantially one piece construction;

the stopper being movable to a second position such that the material is dispensed in a directed manner when the stopper is in the second position;

means for moving the stopper to the second position and to the first position the means for moving comprising a living hinge; and means for biasing said living hinge in a direction such that the stopper is biased toward the first position.

19. The dispensing device of claim 18, wherein the free-flowing material is selected from the group consisting of: a foodstuff, a chemical, a pharmaceutical, and a cosmetic.

20. The dispensing device of claim 19, wherein the foodstuff is selected from the group consisting essentially of: a subdivided material, a powder, a granulated powder, and a fluid; wherein the chemical is selected from the group consisting essentially of: a subdivided material, a powder, a granulated powder, and a fluid; wherein the pharmaceutical is selected from the group consisting essentially of: a subdivided material, a powder, a granulated powder, and a fluid; or wherein the cosmetic is selected from the group consisting essentially of: a subdivided material, a powder, a granulated powder, and a fluid.

21. The dispensing device of claim 18, wherein the means for moving the stopper to the first position comprises at least one living hinge.

22. The dispensing device of claim 18, wherein the stopper and the opening form a seal which is substantially tight to free flowing powder in the first position.

23. The dispensing device of claim 18, wherein the stopper and the opening form a seal which is substantially fluidtight in the first position.

24. The dispensing device of claim 18, wherein the stopper comprises a conical shape stopper.

25. A method of manufacturing a device for dispensing free flowing material, the method comprising the steps of:

preparing a thermoplastic material for injection into a mold, the mold including structures which will create a unitary molded part comprising: a container with a top aperture adapted for the entry of free-flowing material; a bottom opening adapted for the directed dispensing of free-flowing material; and, means for sealing the bottom opening of the container;

injecting the thermoplastic material into the mold to create the unitary molded part;

removing the unitary molded part from the mold; and folding the unitary molded part such that the means for sealing passes through the container in such a way that once through the container the means for sealing no longer passes through the container and can form a seal with the bottom opening of the container and wherein the step of folding the unitary molded part further comprises the bending of the unitary molded part at one or more thin portions which function as at least one living hinge.

26. The method according to claim 25 wherein the step of folding the unitary molded part further comprising the steps of: providing means for reducing the diameter of the means for sealing the bottom opening of the container;

passing the means for sealing through the container by reducing the diameter of the means for sealing and moving the means for sealing through the container; and expanding the diameter of the means for sealing such that the means for sealing forms a seal with the bottom opening.

27. The method according to claim 26 wherein the means for reducing the diameter of the means for sealing comprises a slit having edges, the edges of the slit being overlappable thus decreasing the diameter of said means for sealing and wherein the step of expanding the diameter comprises the step of retracting the edges of the slit resulting in a structure which cannot completely reenter the container.

28. The method according to claim 25 wherein the means for sealing comprises a stopper connected to the container by a member.

29. The method according to claim 28 further comprising a slit formed in the stopper and wherein the step of passing the means for sealing through the container comprises the step of reducing the diameter of the stopper by overlapping at least two edges of the slit and passing the stopper through the container and wherein the step of expanding the diameter of the means for sealing comprises the step of retracting the edges from the overlap to form a stopper which cannot completely pass through the container.

* * * * *